(12) United States Patent
Park

(10) Patent No.: US 7,583,013 B2
(45) Date of Patent: Sep. 1, 2009

(54) PLASMA LIGHTING SYSTEM HAVING THIN METALLIC FILM RESONATOR

(75) Inventor: Byeong-Ju Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 11/535,561

(22) Filed: Sep. 27, 2006

(65) Prior Publication Data

US 2007/0075651 A1 Apr. 5, 2007

(30) Foreign Application Priority Data

Oct. 5, 2005 (KR) ...................... 10-2005-0093592

(51) Int. Cl.
*H01J 5/16* (2006.01)

(52) U.S. Cl. ....................... 313/110; 313/116; 313/112; 313/111; 313/153

(58) Field of Classification Search ................ 313/110, 313/116, 112, 111, 153, 154, 155; 315/248, 315/39
See application file for complete search history.

(56) References Cited

U.S. PATENT DOCUMENTS

| 5,367,226 | A | | 11/1994 | Ukegawa et al. | |
|---|---|---|---|---|---|
| 5,841,244 | A | * | 11/1998 | Hamilton et al. | ............ 315/248 |
| 5,886,478 | A | * | 3/1999 | Smith et al. | .................. 315/248 |
| 6,946,795 | B2 | | 9/2005 | Jeon et al. | |
| 6,949,887 | B2 | * | 9/2005 | Kirkpatrick et al. | ......... 315/248 |
| 2002/0180356 | A1 | * | 12/2002 | Kirkpatrick et al. | ......... 313/607 |

OTHER PUBLICATIONS

U.S. Appl No. 11/536,882 to Park, which was filed on Sep. 29, 2006.
U.S. Appl No. 11/536,924 to Park, which was filed on Sep. 28, 2006.

* cited by examiner

*Primary Examiner*—Tuyet Vo
(74) *Attorney, Agent, or Firm*—Greenblum & Bernstein, P.L.C.

(57) ABSTRACT

Provided is an electrodeless sulfur lamp including a power supply supplying electrical power, a transparent bulb which has a space inside it, with sulfur being contained in the space, and a coil connected to the power supply, which is wound around an outside surface of the transparent bulb and which induces electric discharge by combining magnetic fields. The exclusion of the magnetron in the sulfur lamp increase a system efficacy and saves a cost for the magnetron. Also, it is possible to prevent the coil from blocking light emitted from the main electric discharge sphere 11, because the coil is not wound around the main electric discharge sphere.

14 Claims, 2 Drawing Sheets

PLASMA LIGHTING SYSTEM HAVING THIN METALLIC FILM RESONATOR

This application claims priority under 35 U.S.C. § 119 to Korean Patent Application No. 2005-0093592, filed in Korea on Oct. 5, 2005, the entirety of which is hereby incorporated by reference.

BACKGROUND OF THE INVENTION

1. Field of the Invention

The present invention is related to an electrodeless sulfur lamp, and particularly to an electrodeless sulfur lamp, which do not use magnetron.

2. Description of the Background Art

There are various sources of lighting: an incandescent lamp using heat radiation, a fluorescent lamp of which an electric discharge tube uses a fluorescent material, a high intensity discharge (HID) lamp using electric discharge within a high-pressurized gas or steam, and a plasma lighting system (PLS) lamp using electrodeless discharge.

The various lamps have their respective advantages and disadvantages. The incandescent lamp is excellent in color rendition and small-sized, but inefficient in emitting light and short-lived. A switching-on-light circuit of the incandescent lamp is simple and low-priced. The fluorescent lamp is efficient in emitting light and long-lived, but larger in size, compared to the incandescent lamp. The fluorescent lamp requires the subsidiary switching-on-light circuit. The HID lamp is light-efficient and long-lived, but requires much time between switching off light and switching on light. In addition, the HID lamp, like the fluorescent lamp, requires the subsidiary light-switching circuit. The PLS lamp is much long-lived and efficient in emitting light, compared to the others, but high-priced, and low in power consumption. In addition, the PLS lamp requires the subsidiary switching-on-light circuit.

The PLS lamp is the latest one. An electrodeless sulfur lamp, which belongs to the PLS lamp, is a highly-efficient full-spectrum electrodeless lighting system whose light is generated by sulfur plasma that has been excited by microwave radiation. The electrodeless sufur lamp consists of a golf ball-sized quartz bulb containing several milligrams of sulfur power and argon gas at the end of a thin glass spindle. The bulb is enclosed in a microwave-resonant wire-mesh cage. A magnetron bombards the bulb with 2.45 GHz microwaves. The microwave energy excites the gas to five atmospheres pressure, which in turn heats the sulfur to an extreme degree forming a brightly glowing plasma capable of illuminating a large area. At an initial stage of switching on light, the electric discharge occurs in argon, which is a buffer gas. As temperature increases, the electric discharge occurs in sulfurous steam, thereby emitting white light which is excellent in color rendition.

The first prototype of the electrodeless sulfur lamps were 5.9 kW units, with a system efficacy of 80 lumens per watt. The first production models were 1.4 kW with an output of 135,000 lumens. Later models were able to eliminate the cooling fan and improve efficiency to more than 100 lumens/watt.

A problem with the conventional electrodeless sulfur lamp is that the life of magnetron is life-shorted, compared to the quartz bulb. The design life of the quartz bulb is currently approximately 60,000 hours. However, the design life of the magnetrons is currently only about 15,000 to 20,000 hours. This requires frequent replacement of the life-expired magnetrons with new ones before the life of the quartz bulb expires. The development in the magnetron generating the micro-wave is relatively slow, which contributes to lowering an energy transfer rate.

BRIEF DESCRIPTION OF THE INVENTION

Therefore, Therefore, an objective of the present invention is to provide an electrodeless sulfur lamp with a high efficiency of emitting light without using a short-lived magnetron which is low in energy transfer rate.

According to an aspect of the present invention, there is provided an electrodeless sulfur lamp, including a power supply supplying electrical power, a transparent bulb which has a space inside it, with sulfur being contained in the space, and a coil connected to the power supply, which is wound around an outside surface of the transparent bulb and which induces electric discharge by combining magnetic fields.

According to another aspect of the present invention, there is provided an electrodeless sulfur lamp, including a power supply supplying electrical power, a transparent bulb comprising a main electric discharge sphere which sulfur is contained inside and at least one or more subsidiary electric discharge rods formed on an outside surface of the main electric discharge sphere to be connected to and open to the main electric discharge sphere, and a coil which is wound around the subsidiary electric discharge rods and connected to the power supply to induce electric discharge by combining magnetic fields when electrical is applied.

According to another aspect of the present invention, there is provided an electrodeless sulfur lamp, including a power supply supplying electrical power, a transparent bulb comprising a main electric discharge sphere which sulfur is contained inside and a subsidiary electric discharge rod formed separately from the main electric discharge sphere, which a subsidiary electric material necessary to initially switch on light is contained inside, and a coil which is wound around the subsidiary electric discharge rod and connected to the power supply to induce electric discharge by combining magnetic fields when electrical is applied.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
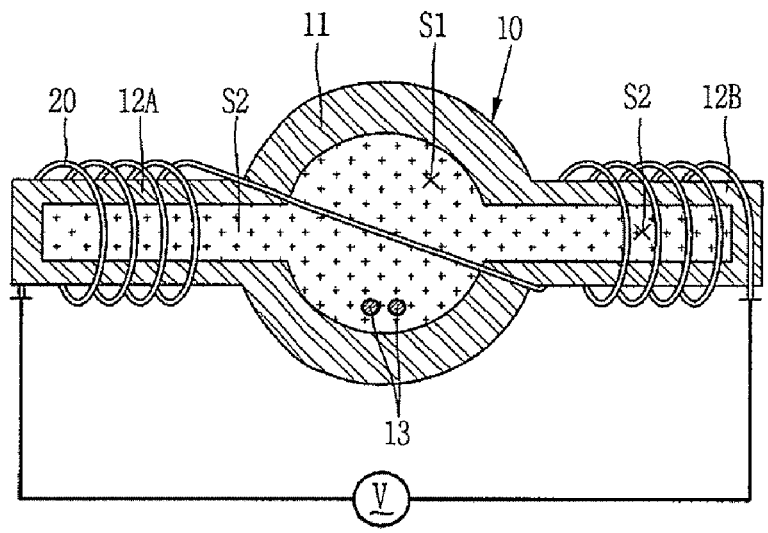
FIG. 1 is a cross-sectional view illustrating an electrodeless sulfur lamp according to a first embodiment of the present invention.
Figure 2:
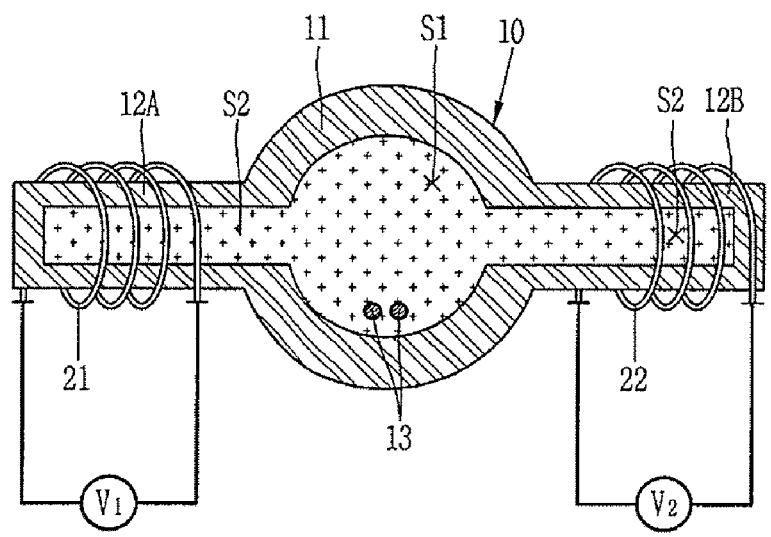
FIG. 2 is a cross-sectional view illustrating an electrodeless sulfur lamp according to a second embodiment of the present invention.
Figure 3:
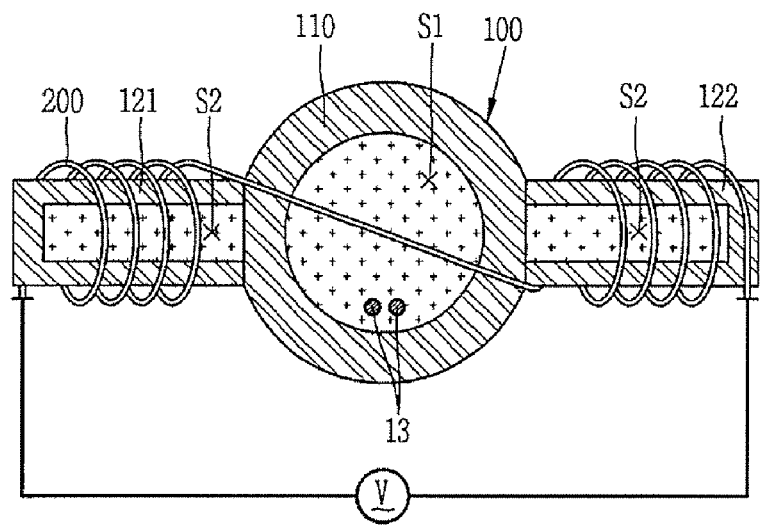
FIG. 3 is a cross-sectional view illustrating an electrodeless sulfur lamp according to a third embodiment of the present invention.
Figure 4:
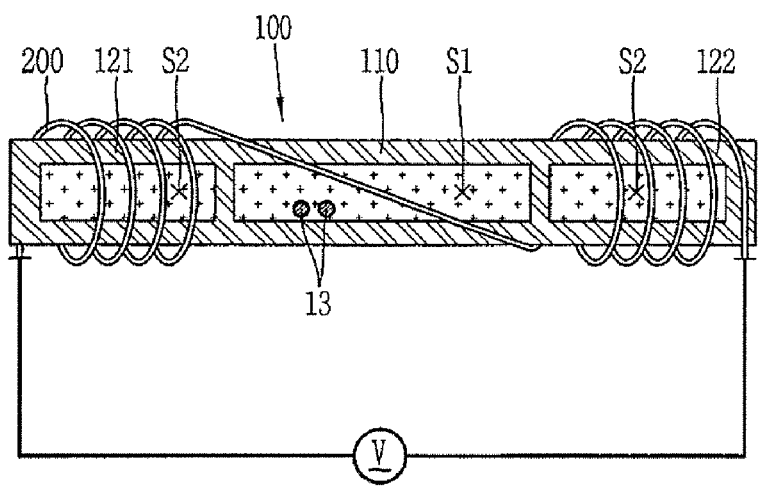
FIG. 4 is a cross-sectional view illustrating an electrodeless sulfur lamp according to a forth embodiment of the present invention.

FIG. 1 is a cross-sectional view illustrating an electrodeless sulfur lamp according to a first embodiment of the present invention. FIG. 2 is a cross-sectional view illustrating an electrodeless sulfur lamp according to a second embodiment of the present invention. FIG. 3 is a cross-sectional view illustrating an electrodeless sulfur lamp according to a third embodiment of the present invention. FIG. 4 is a cross-sectional view illustrating an electrodeless sulfur lamp according to a forth embodiment of the present invention.

As shown in FIGS. 1 through 4, the electrodeless sulfur lamp according to the present invention includes a transparent bulb 10 which has an space inside it, and a coil 20 provided to an outside surface of the bulb. A main electric discharge material, such as sulfur 13, and a subsidiary electric discharge material are contained in the space of the transparent bulb 10. The coil 20, when electrical power is applied, induces magnetic fields.

The transparent bulb 10 includes a main electric discharge sphere 11, made of quartz, which has specific thickness and diameter to resist heat occurring in the space "S1" and subsidiary electric discharge rods 12a and 12b which are symmetrically provided to protrude from an outside surface and which the coil 20 is wound around.

The transparent bulb 10 has the space "S1" inside it. The space "S1" contains a main electric discharge material such as sulfur, and a subsidiary electric discharge material such as argon, neon, zenon or krypton which is in use for initially switching on light and which is low in electrolytic voltage and metastable voltage.

The subsidiary electric discharge rods 12a and 12b are cylinder-shaped. 5 An inside space "S2" of the subsidiary electric discharge rods are connected to the inside space "S1" of the main electric discharge sphere. One end of each of the subsidiary electric discharge rods is open to the space "S1" of the main electric discharge sphere. The other end is closed. The main electric discharge sphere 11 and the subsidiary electric discharge rods 12a and 12b may be formed as one body. Otherwise, The main electric discharge sphere 11 and the subsidiary electric discharge rods 12a and 12b may be separately formed and the subsidiary electric discharger rods 12a and 12b may be later attached to the main electric discharge sphere 11.

The coil, as shown in FIG. 1, may be wound around one subsidiary electric discharge rod 12a and then continuously around the other subsidiary electric discharge rod 12b, with both ends of the coil connected to the power supply. Or, the coil, as shown in FIG. 2, may be independently wound around each of the subsidiary electric discharge rods 12a and 12b, Both ends of each are connected to separate power supplies "V1" and "V2," respectively.

Operation of the electrodeless sulfur lamp according to the present invention is now described.

Alternating magnetic fields, when electric power is applied, are generated round the subsidiary electric discharge rods 12a and 12b. This alternating magnetic fields causes the subsidiary electric discharge material contained in the space "S2" of the subsidiary discharge sphere 12a and 12b to become in plasma phase, thereby generating energy. A generated energy is transferred to sulfur 13 contained in the space "S1" of the main discharge sphere 11. Thus, phase of sulfur 13 is changed from solid phase to liquid phase to gas phase, and finally to plasma phase, thereby emitting visible light.

Because the coil is not wound around the main discharge sphere, as shown in FIGS. 1 and 2, it is possible to prevent the coil from blocking light emitted from the main discharge sphere 11. Thus, the extension of the life of the sulfur lamp and the high efficiency of emitting light is made realized which are difficult to realized in the sulfur lamp having electrodes. The chemical reaction of the electrodes with the sulfur largely shortens the life of the sulfur lamp having the electrodes.

A second embodiment of the present invention is now described.

The transparent bulb 100 includes the main discharge sphere 110 and the subsidiary discharge rods 121 and 122 which are separately formed, as shown in FIGS. 3 and 4. The main discharge material, such as sulfur. Is contained in a space "S1". The subsidiary electric discharge material, such as argon or neon, may be contained in the space "S1", along with the main electric discharge material. The subsidiary electric discharge material only is contained in a space of the subsidiary electric discharge rods 121 and 122

As in the first embodiment, the coil may be wound around one subsidiary electric discharge rod 121 and then continuously around the other subsidiary electric discharge rod 122, with both ends of the coil connected to the power supply, or may be independently wound around each of the subsidiary electric discharge rods 121 and 122, with both ends of each connected to separate power supplies "V1" and "V2," respectively.

In a case where the main electric discharge material is contained in the main electric discharge sphere 110 and the subsidiary electric discharge in the subsidiary electric discharge rods 121 and 122, load to the main electric discharge sphere 110 is reduced, thereby relatively strengthening combination of magnetic fields. This gives rise to the stable electric discharge.

The addition of the subsidiary electric discharge rods to the main electric discharge sphere and the winding of the coil around the subsidiary electric discharge rods enables the sulfur to becomes in plasma phase and emit light without having to use the magnetron which is low in energy transfer rate. The exclusion of the magnetron in the sulfur lamp increase a system efficacy and saves a cost for the magnetron. Also, it is possible to prevent the coil from blocking light emitted from the main electric discharge sphere 11, because the coil is not wound around the main electric discharge sphere, As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An electrodeless sulfur lamp, comprising:
 a power supply supplying electrical power;
 a transparent bulb comprising a main electric discharge sphere which sulfur is contained inside and at least one or more subsidiary electric discharge rods formed on an outside surface of the main electric discharge sphere to be connected to and open to the main electric discharge sphere; and a coil which is wound around the subsidiary electric discharge rods and connected to the power supply to induce electric discharge by combining magnetic fields when electrical power is applied.

2. The electrodeless sulfur lamp according to claim 1, wherein a subsidiary electric discharge material necessary to initially switch on light is contained inside the transparent bulb, along with the sulfur.

3. The electrodeless sulfur lamp according to claim 2, wherein at least one or more subsidiary electric discharge materials selected from the group consisting of argon, neon, zenon and krypton are contained inside the transparent bulb.

4. The electrodeless sulfur lamp according to claim 1, wherein the coil is continuously wound around the subsidiary electric discharge rods.

5. The electrodeless sulfur lamp according to claim 4, wherein the number of times which the coil is wound around the subsidiary electric discharge rods is greater than the number of times which the coil is wound around the main electric discharge sphere.

6. The electrodeless sulfur lamp according to claim 1, wherein a plurality of the coil are wound around the subsidiary electric discharge rods with each being independent from each other.

7. The electrodeless sulfur lamp according to claim 6, wherein the coil is independently wound around each of the subsidiary electric discharge rods.

8. An electrodeless sulfur lamp, comprising:
a power supply supplying electrical power;
a transparent bulb comprising a main electric discharge sphere which sulfur is contained inside and a subsidiary electric discharge rod formed separately from the main electric discharge sphere, which a subsidiary electric material necessary to initially switch on light is contained inside; and
a coil which is wound around the subsidiary electric discharge rod and connected to the power supply to induce electric discharge by combining magnetic fields when electrical power is applied.

9. The electrodeless sulfur lamp according to claim 8, wherein a subsidiary electric discharge material necessary to initially switch on light is contained inside the transparent bulb, along with the sulfur.

10. The electrodeless sulfur lamp according to claim 9, wherein at least one or more subsidiary electric discharge materials selected from the group consisting of argon, neon, zenon and krypton are contained inside the transparent bulb.

11. The electrodeless sulfur lamp according to claim 8, wherein the coil is continuously wound around the subsidiary electric discharge rods.

12. The electrodeless sulfur lamp according to claim 11, wherein the number of times which the coil is wound around the subsidiary electric discharge rods is greater than the number of times which the coil is wound around the main electric discharge sphere.

13. The electrodeless sulfur lamp according to claim 8, wherein a plurality of the coil are wound around the subsidiary electric discharge rods with each being independent from each other.

14. The electrodeless sulfur lamp according to claim 13, wherein the coil is independently wound around each of the subsidiary electric discharge rods.

* * * * *